United States Patent [19]

Haberland et al.

[11] Patent Number: 4,726,648
[45] Date of Patent: Feb. 23, 1988

[54] OPTOELECTRONIC MODULE

[75] Inventors: Detlef Haberland, Steinebach/Woerthsee; Michael Langenwalter, Stockdorf; Jan Smola, Munich, all of Fed. Rep. of Germany

[73] Assignee: Siemens Aktiengesellschaft, Berlin and Munich, Fed. Rep. of Germany

[21] Appl. No.: 817,182

[22] Filed: Jan. 8, 1986

[30] Foreign Application Priority Data

Feb. 13, 1985 [DE] Fed. Rep. of Germany ....... 3504947

[51] Int. Cl.⁴ .......................... G02B 6/36; G02F 2/00
[52] U.S. Cl. ................. 350/96.20; 350/96.10; 350/96.18
[58] Field of Search ............. 350/96.15, 96.16, 96.18, 350/96.20

[56] References Cited

U.S. PATENT DOCUMENTS

| 3,950,075 | 4/1976 | Cook et al. | 350/96 C |
| 4,204,743 | 5/1980 | Etaix | 350/96.20 |
| 4,281,891 | 8/1981 | Shinohara et al. | 350/96.18 |
| 4,357,072 | 11/1982 | Goodfellow et al. | 350/96.20 |
| 4,383,731 | 5/1983 | Simon et al. | 350/96.20 X |
| 4,399,453 | 8/1983 | Berg et al. | 350/96.20 X |
| 4,627,687 | 12/1986 | Dorn et al. | 350/96.20 |
| 4,639,077 | 1/1987 | Dobler | 350/96.20 |
| 4,650,285 | 3/1987 | Stevenson | 350/96.20 X |

FOREIGN PATENT DOCUMENTS

| 2437637 | 4/1980 | France . |
| 57-113212 | 7/1982 | Japan . |
| 644948 | 8/1984 | Switzerland . |

Primary Examiner—William L. Sikes
Assistant Examiner—Akm E. Ullah
Attorney, Agent, or Firm—David N. Cacarappa

[57] ABSTRACT

An optoelectronic module is disclosed comprising an optoelectronic component (D), e.g. a photodiode (D) and/or a laser diode (D); a ring (RI) as an optical aperture in a wall of its housing (S/E/P, S/G/W) for the transmission of information-modulated light to or from the component (D) through the housing wall (S) to or from an optical component (L); and a lens system (K) having at least one lens (K), among them, at least one focusing lens (K) encircled by the ring (RI) or at least by a section of the ring (RI). At least one of the lenses (K) consists of glass and is intergrown with the ring (RI), at least in part consisting of glass, so as to be hermetically tight all around forming an intergrowth zone (SZ). Furthermore, the ring (RI) is inserted in the housing wall so as to form a hermetically tight seal.

24 Claims, 5 Drawing Figures

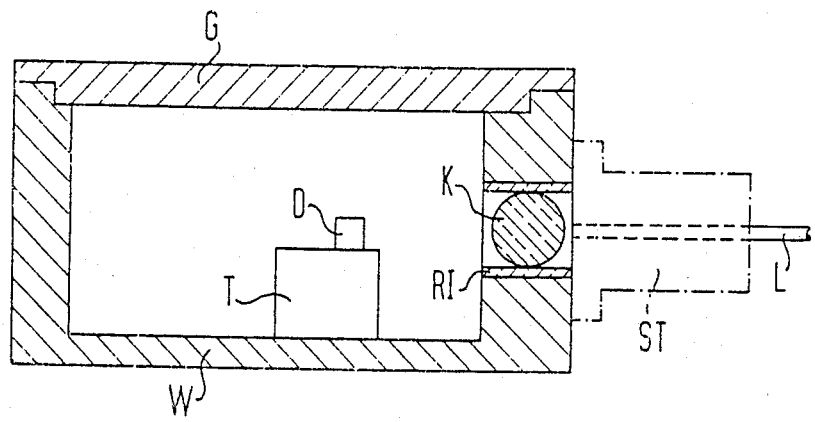
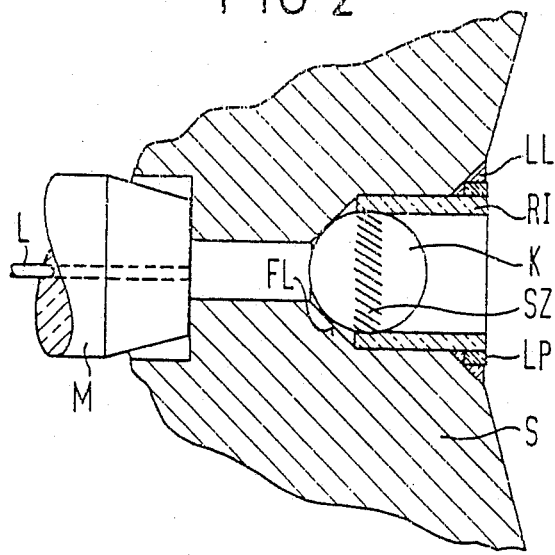

OPTOELECTRONIC MODULE

BACKGROUND OF THE INVENTION

1. Technical Field

This invention relates to the field of optical communication systems and, more particularly, to an optoelectronic terminating module for an optical fiber cable.

2. Description of the Prior Art

In a module known from U.S. Pat. No. 3,950,075, a mounting for an optical lens consists essentially of a plastic ring, the deformability of which is utilized to push it self-clamping onto a spherical lens used as a focusing lens. This known module already has the advantage that, by means of the lens system, here formed by a single spherical lens, it is possible to obtain, at least for a time, a very good optical adaptation between the component and the light waveguide supplied to the module extraneously.

It turns out, however, that the known module is not capable of function for a sufficiently long enough period of time in many applications. Tests of this known module have shown that contaminations of the gas inside the module can occur which can adversely affect the qualities of the component over time. These contaminations were caused primarily by the declining tightness of the gap between ring and spherical lens and/or between ring and housing wall. While remedies such as cementing the spherical lens into the plastic ring—also into a ring of a different material—had the effect that the spherical lens and the ring were insertable into the module housing wall hermetically tight at first so that no contaminants impairing the module qualities could penetrate from the outside, it turned out that such insertions often did not remain hermetically tight as time progressed. The adhesive would frequently develop cracks, and even the plastic of the ring itself was not entirely gastight and moisturetight. Beyond this, there was a danger of smearing the lens systems with adhesive during manufacture or during an attempted maintenance procedure.

Thus it became an object of the present invention to improve the long-term behavior of the module, in particular, to increase substantially and with great certainty the length of time during which the component is fully capable of operation and, in particular, free of contamination.

SUMMARY OF THE INVENTION

The solution of this problem is based on the concept of improving by particularly inexpensive measures the hermatic tightness of the insertion of the lens system into the housing of the module so as to be stable over the long term. The mutual adjustment of the ring and of the lens it encircles should be accurately producible so as to be relatively permanent in the not yet inserted condition, i.e. during the storage of this lens/ring unit. This unit should also be producible simply and economically. Also, the module should be insertable hermetically tight into the housing wall, precisely and easily, and it should consist of gastight materials resistant to aging.

The object of the invention, based on these concepts and catalog of requirements, can be solved by intergrowing the lens and ring system so that the system is hermetically tight all around the sphere so that the system can be inserted as a unit in the housing wall.

The invention will now be explained in greater detail by way of the specific exemplary embodiments of the invention shown in the following described figures.

BRIEF DESCRIPTION OF THE DRAWINGS

FIG. 1 shows one exemplary embodiment of a module with the lens/ring unit mounted to the housing;

FIG. 2 is a cut-out section showing another lens/ring unit;

DETAILED DESCRIPTION

Figure 3:
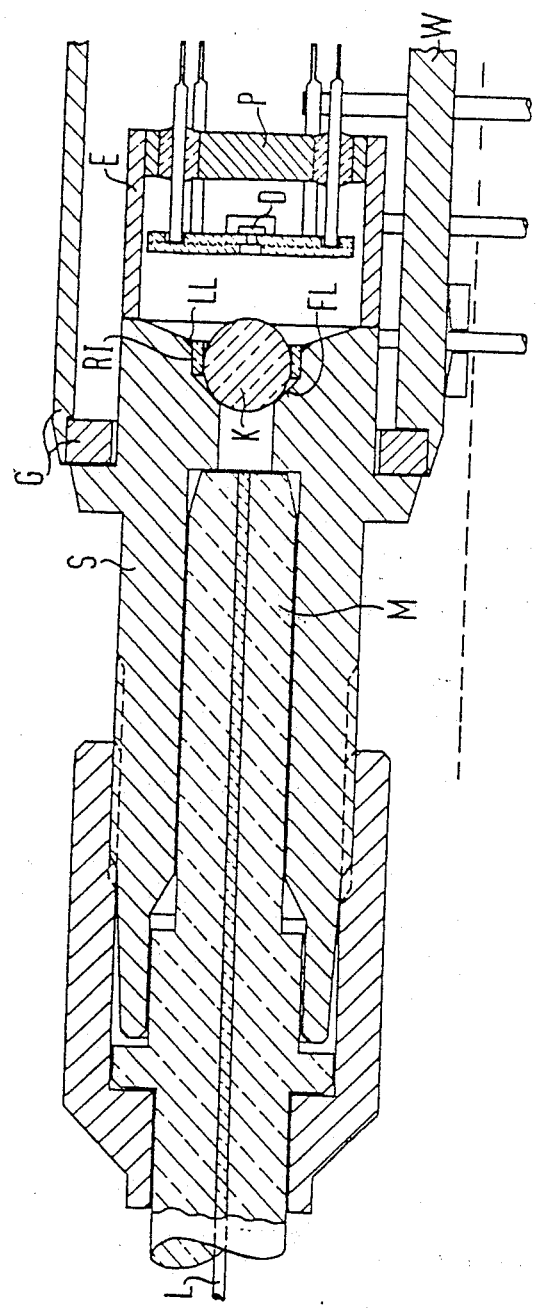
FIG. 3 shows another exemplary embodiment of a module with a glass fiber plug and with an assembled lens/ring unit as per FIG. 2.

FIGS. 1 and 3 show two different module examples, each having hermetically sealed housings G/W in FIG. 1, and S/G/W or heremetically sealed inner housing S/E/P in FIG. 3. In both examples, these housings contain an optoelectronic component, such as a light-receiving photodiode and/or a light-emitting laser diode.

In both examples, also, a ring RI forms an optical aperture in the housing wall; see G/W or S/G/W or S/E/P. The aperture serves the transmission of information-modulated light in an optical communication system from the component D through the housing wall W or S to an optical component L, such as a light waveguide L, i.e. to a single mode glass fiber L, for instance, and/or from an optical component L through the housing wall W, S to the component D.

Further shown in both figures is a lens system K of at least one lens K, among them at least one focusing lens, here spherical lens K, at least one of these lenses, (see the spherical lens K) being framed by the ring RI, or at least by a section of the ring RI.

According to the present invention, at least one of the lenses consists of glass—here the ground, polished and surface-treated spherical glass lens K of e.g. 2.000±0.0005 mm diameter, and the glass is first intergrown with the ring RI, which may also consist of glass, so as to be hermetically sealed all around, forming an intergrowth zone SZ; see the cut-out section in FIG. 2. The ring RI, in turn, is inserted in the housing wall W, S so as to be hermetically sealed; see, for example, the solder seam LL all around a tube end in FIGS. 2 and 3.

Both examples have the advantage that, by means of the lens system which here is formed of a single spherical lens K, a very good optical adaptation can be obtained between the component D and the light waveguide L led to the module from the outside. Both examples are fully capable of functioning for a particularly long time. Contaminations of the gas inside the module are prevented for a particularly long time. Hence, the qualities of the component D are affected accordingly little. The tightness of the gap between the ring and the spherical lens and/or between the ring and the housing wall does not weaken in time as with prior art systems, the lens K and the ring RI also being inserted in the housing wall of the module hermetically sealed and stable over the long term so that no contaminants impairing the module qualities can penetrate into the housing from the outside. In addition, there is no longer a danger of accidentally smearing the lens system with adhesive.

Accordingly, the invention solves the problem of improving the long-term behavior of the module while greatly increasing the length of time during which the component or module is fully capable of functioning free of contamination since the hermetic seal of the lens system and its ring is improved so as to remain stable over the long term by measures requiring particularly little sophistication. The mutual adjustment of the ring and the lens it frames is producible in advance of insertion for any desired precision level. By long-term stable intergrowth, the unit also is simple to produce and readily insertable into the housing wall so as to be hermetically sealed, as well as consist of gastight materials resistant to aging.

The invention preferably utilizes specific glasses. The glass of the ring RI should preferably have, at least in the area of the intergrowth zone SZ, (see FIG. 2), a coefficient of thermal expansion similar to that of the glass of the lens K framed by the ring RI. This makes it possible to reduce the amount of scrap made in the manufacture of the lens/ring unit K/RI and to use a lens K of the highest optical quality, i.e. a lens K precision-ground to far below 1 micron, polished and permanently surface-treated without adversely affecting the optical quality of this lens in the course of producing the module. In particular one following these measures is not seriously risking internal tensions within the lens and, hence, optically disturbing striae.

Such internal tensions and striae, to the extent that they may first occur at all during the intergrowth, can be reduced in particular in that the ring RI and the lens K are jointly tempered after their intergrowth. This also makes bursting of the intergrown lens/ring unit preventable, particularly during the production of this K/RI unit or when it is stored and shock-stressed, such as during its subsequent insertion into the housing wall W or S. Furthermore, this action avoids to a great extent a creeping of the glasses K/RI and, hence, a gradual deterioration of the optical quality of the lens K, keeping it stable over the long term even at longlasting, elevated operating temperatures of the lens.

It is beneficial to select the temperature limit above which the glass of ring RI becomes soft or pasty lower by e.g. 50° C. than the pasting point of the lens K glass. Even if the ring RI and the lens k were heated slightly above the pasting point of the lens glass briefly, the ring RI would be particularly soft and, if only because of its surface tension, would quickly hug the lens K and intergrow with the lens K. But it is less dangerous for the optical quality of lens K to heat both the ring RI and the lens K for intergrowing to a temperature only which, while being clearly above the pasting point of the ring RI glass, is still clearly below the pasting point of the lens K glass. When intergrowing, the pasty ring RI will then readily hug the still stiff lens K, e.g. if only because of its surface tensions, without having to risk that the lens K will also deform.

Figure 4:
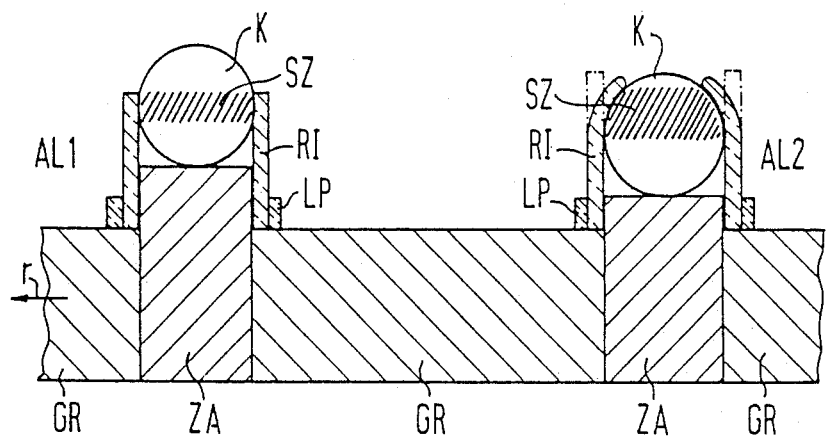
FIG. 4 is an example of a graphite carrier plate having graphite humps on which lie two different examples of lens/ring units already grown together.

FIG. 2 and FIG. 4 (the left most lens/ring) show examples where the intergrowth zone SZ lies at one end of the tube RI. This has the advantage that, even at substantial differences between the coefficients of thermal expansion of the lens K glass on the one hand and of the ring RI glass on the other, the internal tensions within the lens which can possibly occur after the intergrowth and cooling and originate due to compressive, tensile or shearing forces exerted by the ring RI on the lens, remain small so that the optical qualities of the lens are unaffected and remain stable for a particularly long time.

On the other hand, (see FIG. 4, right), the intergrowth zone SZ may lie on the inside surface of the tube RI in the interior of tube RI. Zone SZ is a particularly wide intergrowth zone SZ and, hence, a particularly safe hermetic seal and a particularly good protection against damaging the intergrown lens/ring unit K/RI during temporary storage and subsequent insertion in the housing wall.

It is very beneficial if, as in FIGS. 1 through 4, the lens K framed by the ring is formed by a spherical lens K, i.e. by a type of focusing lens requiring no sophistication to make the optical axis of the lens coincide with the tube axis.

Easy exchangeability and, hence, ready reparability of the lens is chievable since the ring RI may be fastened to the housing wall S detachably but hermetically tight, i.e. by means of a rubber seal and by jamming the K/RI unit against the housing wall via the rubber seal.

On the other hand, it is also very beneficial to join the ring RI permanently to the housing wall at its outside diameter and close to the intergrowth zone SZ at a distance from the intergrowth zone SZ less than the lens K diameter to facilitate the mutual adjustments of component D, lens K and light waveguide or component L forming an additional adjustment surface at the housing wall. See the tapered surface FL in FIG. 2 or FIG. 3 which serve as a stop for the lens K. Through these measures it is possible to reduce the danger of possibly intolerable maladjustments of the lens K which are often caused primarily by thermal expansions while permanently joining the ring RI to the housing wall and by heating the K/RI unit to varying temperatures in the subsequent off/on operation of the module.

It is advantageous, for instance, to produce a permanent connection by fastening the ring RI to the housing wall by soldering with a solder whose melting temperature is lower than the pasting point of the ring RI glass. In this manner, the permanent connection can be made without unduly heating the ring RI glass, i.e. without the lens K maladjustment hazards associated therewith and without hard-to-handle deformations of the ring RI due to its becoming pasty.

The outside diameter of the ring RI need not always be constant as shown in FIGS. 1 through 4. The ring RI may also have at its outside surface e.g. a flange (not shown) and may be joined to the housing wall essentially e.g. at its flange area, completely or partly but not joined at its other outside surface. This makes it possible to utilize a special outside surface of the ring RI, which, if needed, may also be orientable perpendicular to the tube axis, to fasten it to the housing wall, such a flange being easy to produce in the course of intergrowing lens and ring. For example, the flange may be produced in the pasty state of the ring by spinning the ring; furthermore, if only the flange is fastened to the housing wall, a belated distortion of the lens K due to forces released by this fastening can be avoided to a great extent.

It is advantageous to make the ring RI entirely of glass, such as by cutting a cylindrical glass tube into sections of suitable length, the ring RI then being formed by such a glass tube length of annular section.

The ring RI may also be fused together zonewise of different glasses, in which case the glass of ring RI may have a coefficient of thermal expansion in the intergrowth zone SZ similar to that of the lens K glass. On the other hand, the glass of ring RI near the zone where it is fastened to the housing wall S may have a different coefficient of thermal expansion, namely one closer to that of the housing wall. In this manner, the coefficient of thermal expansion of ring RI can be adapted well to those of both the lens K and the housing wall W,S locally, even if the coefficient of thermal expansion of lens K and housing wall W or S are quite different.

FIG. 4 shows, on the right, an example AL2 of a lens/ring unit K/RI in which the lens K, after intergrowth, is located so far inside the tube RI and the ring RI is shrunk so tightly onto the lens K that the lens K is also intergrown with the tube RI far away from its largest diameter. Varying from the example AL1 shown in FIG. 4, left, this results in a particularly wide fusion zone and, hence, in a particularly safe hermetic seal and in a particularly good protection against damaging the intergrown lens/ring unit when storing it temporarily or inserting it.

The ring RI may also be produced in multilayered fashion by using a ring RI which is metallic per se and contains on its inside diameter, at least in the area of the intergrowth zone SZ, glass adhering to the metal, i.e. enamel, this enamel layer having an intergrowth zone SZ with the lens K. A very strong metal/enamel ring can then be used, e.g. to achieve a particularly high safety against bursting of the ring RI when assembling the module as well as good heat conduction between the housing wall on the one hand and the intergrowth zone SZ or the lens rim on the other. Such a metal ring RI may also be fastened permanently to the housing wall by welding whereby a particularly reliable fastening of the ring RI to the housing wall is obtained which remains hermetically tight for a long time.

Figure 5:
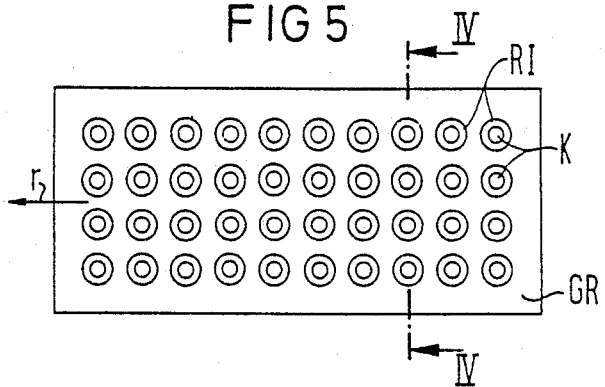
FIG. 5 shows a top view of a carrier/plate which may be designed in accordance with FIG. 4.

To produce the intergrowth between the glass of lens K and the glass or enamel of ring RI, the ring RI and the lens K may be placed in their desired mutual position prior to the intergrowth of ring RI and lens K by putting them on a carrier plate GR and then bringing the carrier plate GR into the heat zone of a furnace. Referring to FIGS. 4 and 5, the intergrowth of lens K and ring RI can thus be obtained in a particularly simple manner. Smearing or scratching the glass surface of lens K and/or ring RI can be prevented in this operation simply by making the carrier plate GR of graphite.

If in this operation the furnace is a continuous heating oven, (see travel direction r in FIGS. 4 and 5), the lens/ring units disposed on the carrier plate GR can be produced in great numbers accurately and in particularly simple manner in mass production.

It is beneficial for the carrier plate GR to have one or more cylindrical humps ZA over which the respective ring RI is placed and on top of which the lens K is put; see FIGS. 4 and 5. It is thus possible to prevent severe shrinking of the ring segment placed over the hump ZA and later to be fastened to the housing wall facilitating the mutual adjustment of ring RI and lens K in their desired position prior to their subsequent mutual intergrowth and, at the same time, avoiding an intergrowth with adjacent rings on the carrier plate.

The individual cylindrical humps ZA of the carrier plate GR are producible in particularly simple manner by drilling a hole for each hump in the carrier plate GR through which a graphite pin ZA is pushed so that a part of the pin ZA projects as a hump beyond the surface of the carrier plate GR.

The invention permits the mounting of other devices, if needed, inside the housing and, if needed, also in and/or on other places of the housing wall. FIGS. 1 to 3 show some examples of this; see, for example, the tableshaped temperature stabilizer T shown in FIG. 1, or also the glass fiber support ST in FIG. 1, or the glass fiber connector M/L designed as a pull-out plug pin M with the plug counterpart S in FIGS. 2 and 3, or the tableshaped holder of the component D inside the inner housing S/E/P and, hence, inside outer housing S/G/W in FIG. 3. With respect to these inner and outer housings they may each be produced so as to be hermetically sealed in a durable manner.

What is claimed is:

1. An optoelectronic module of an optoelectronic communiation system comprising
   (a) an optoelectronic component;
   (b) a ring for forming an optical aperture in a wall of a housing of the module for transmission of information-modulated light through the housing wall between said optoelectronic component and an optical transmission component; and
   (c) a lens system, including at least one focusing lens, encircled by the ring or at least by a section of the ring, for forming the interface between an electrical connecting line and the optical transmission component of said optoelectronic communication system, characterized in that said focusing lens (K), consisting of glass, is intergrown with the ring (RI), consisting at least in part of glass, hermetically tight all around, forming an intergrowth zone (SZ); and the ring (RI) is inserted hermetically tight into the housing wall (W, S).

2. The module according to claim 1 further characterized in that the coefficient of thermal expansion of the glass ring (RI), at least in the intergrowth zone (SZ) area, is approximately equal to the coefficient of thermal expansion of the glass of the lens (K) encircled by the ring (RI).

3. The module according to claim 1 further characterized in that the pasting point of the glass ring (RI), is lower than the pasting point of the lens (K) glass.

4. The module according to claim 1 further characterized in that the ring is elongated forming a tube and the intergrowth zone (SZ) is located at one end of the tube (RI).

5. The module according to claim 1 further characterized in that the ring is elongated forming a tube and the intergrowth zone (SZ) is located on the inner surface of the tube (RI) in the interior of the tube (RI).

6. The module according to claim 1 further characterized in that the lens (K), encircled by the ring, is formed in the shape of a sphere (K).

7. The module according to claim 1 further characterized in that the ring (RI) is fastened to the housing wall (S) so that it may be subsequently detached but creates a hermetically tight seal.

8. The module according to claim 1 further characterized in that the ring (RI) is permanently joined to the housing wall (S) on the ring's (RI) outside diameter, but near the intergrowth zone (SZ) at a distance from the intergrowth zone (SZ) less than the lens (K) diameter.

9. The module according to claim 8 further characterized in that the ring (RI) is fastened to the housing wall (S) by soldering with a solder compound whose melting point is lower than the pasting point of the glass ring (RI).

10. The module according to claim 1 further characterized in that the ring (RI) has on an outside diameter a flange and is joined to the housing wall (S) essentially at its outside flange diameter.

11. The module according to claim 1 further characterized in that the ring (RI) consists entirely of glass.

12. The module according to claim 1 further characterized in that the ring (RI) is formed from a length of a glass tube of round section.

13. The module according to claim 11 further characterized in that the ring is made of different glasses, namely (a) the ring (RI) glass in the area of the intergrowth zone (SZ) has a coefficient of thermal expansion approximately equal to that of the lens (K) glass, but (b) the ring (RI) glass near the zone where the ring (RI) is fastened to the housing wall (S) has a coefficient of thermal expansion closer to that of the housing wall.

14. The module according to claim 5 further characterized in that, after intergrowth, the lens (K) is located so far inside the tube (RI) and the ring (RI) is shrunk so tightly about the lens (K) that the lens (K) is intergrown with the tube (RI) inside as well as outside its largest diameter.

15. The module according to claim 1 further characterized in that the ring (RI) is multilayered, and comprises primarily a metallic layer but consists also on an inner surface, at least in the area of the intergrowth zone (SZ), of a glass layer adhering to the metal.

16. The module according to claim 17 further characterized in that the ring (RI) is fastened to the housing wall (S) by welding.

17. A method for producing an optoelectronic module for an optoelectronic communication system, said module including: a module housing, an optoelectronic component placed within said housing, an optical transmission component, a glass focusing lens, and a ring consisting at least in part of glass, comprising the steps of:

intergrowing said focusing lens with said ring hermetically tight all around forming an intergrowth zone; and forming an aperture in a wall of said housing by inserting said intergrown lens and ring into said housing wall hermetically tight, thereby forming an interface between said optoelectronic component and said optical transmission component.

18. The method according to claim 4 characterized in that, prior to intergrowing the ring (RI) and the lens (K), they are placed on a carrier plate (GR) in their desired mutual positions, and the carrier plate (GR) is then brought into the heat zone of a furnace.

19. The method according to claim 18 further characterized in that the carrier plate (GR) consists of graphite.

20. The method according to claim 18 further, characterized in that the furnace is a continuous heating oven.

21. The method according to claim 18 further characterized in that the carrier plate (GR) has a cylindrical hump (ZA) over which the ring (RI) is placed and on top of which the lens (K) is positioned.

22. The method according to claim 21 characterized in that the carrier plate (GR) contains a hole through which a graphite pin (XA) is pushed forming the cylindrical hump beyond the surface of the carrier plate (GR).

23. A method of producing a module according to claim 7 characterized in that after the ring (RI) and the lens (K) are intergrown the intergrown lens and ring are jointly tempered.

24. A method of producing a module according to claim 17 characterized in that both the ring (RI) and the lens (K) are heated for the intergrowth step to a temperature above the pasting point of the glass ring (RI) but below the pasting point of the glass lens (K).

* * * * *